(12) United States Patent
Heidecke

(10) Patent No.: US 6,679,115 B2
(45) Date of Patent: Jan. 20, 2004

(54) APPARATUS FOR DETERMINING THE FILLING LEVEL OF A PRODUCT IN A CONTAINER

(75) Inventor: Frank Heidecke, Freiburg (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 10/074,241

(22) Filed: Feb. 14, 2002

(65) Prior Publication Data
US 2002/0133303 A1 Sep. 19, 2002

Related U.S. Application Data
(60) Provisional application No. 60/277,256, filed on Mar. 21, 2001.

(30) Foreign Application Priority Data
Feb. 14, 2001 (DE) .......................... 10106681

(51) Int. Cl.$^7$ .................. G01F 23/00; G01F 25/00
(52) U.S. Cl. .................. 73/290 V; 340/621; 73/1.73
(58) Field of Search .................. 73/1.73, 290 V; 340/621; 324/76.41, 76.42

(56) References Cited

U.S. PATENT DOCUMENTS

| | | | | |
|---|---|---|---|---|
| 4,221,004 A | * | 9/1980 | Combs et al. .............. 367/114 |
| 4,315,325 A | * | 2/1982 | Blades ........................ 367/98 |
| 4,675,854 A | * | 6/1987 | Lau ............................. 367/98 |
| 4,700,569 A | * | 10/1987 | Michalski et al. ........ 73/290 V |
| 4,972,386 A | * | 11/1990 | Lau ............................. 367/99 |
| 4,975,889 A | * | 12/1990 | Petrucelli et al. ............ 367/98 |
| 5,075,863 A | | 12/1991 | Nagamune et al. |
| 5,827,943 A | * | 10/1998 | Schmidt ..................... 73/1.73 |
| 6,047,598 A | * | 4/2000 | Otto et al. ................ 73/290 V |
| 6,415,660 B1 | * | 7/2002 | Sinz et al. ................ 73/290 R |

* cited by examiner

Primary Examiner—Helen Kwok
Assistant Examiner—Katina M Wilson
(74) Attorney, Agent, or Firm—Jones, Tullar & Cooper, P.C.

(57) ABSTRACT

An apparatus for determining the filling level of a product in a container with a transmission unit which generates high-frequency signals and emits them at a predetermined pulse repetition frequency in the direction of the surface of the filled product. The signals are reflected by the surface of the filled product and are received by a receiving unit. A delay circuit transforms the high-frequency signals/reflected signals into low-frequency signals in accordance with a predetermined translation factor and with an evaluation unit which determines the filling level of the product in the container on the basis of the delay time of the signals. The delay circuit includes: a transmission oscillator; a sampling oscillator; a digital sampling circuit; and a closed-loop/open-loop control unit.

20 Claims, 5 Drawing Sheets

Figure 1:
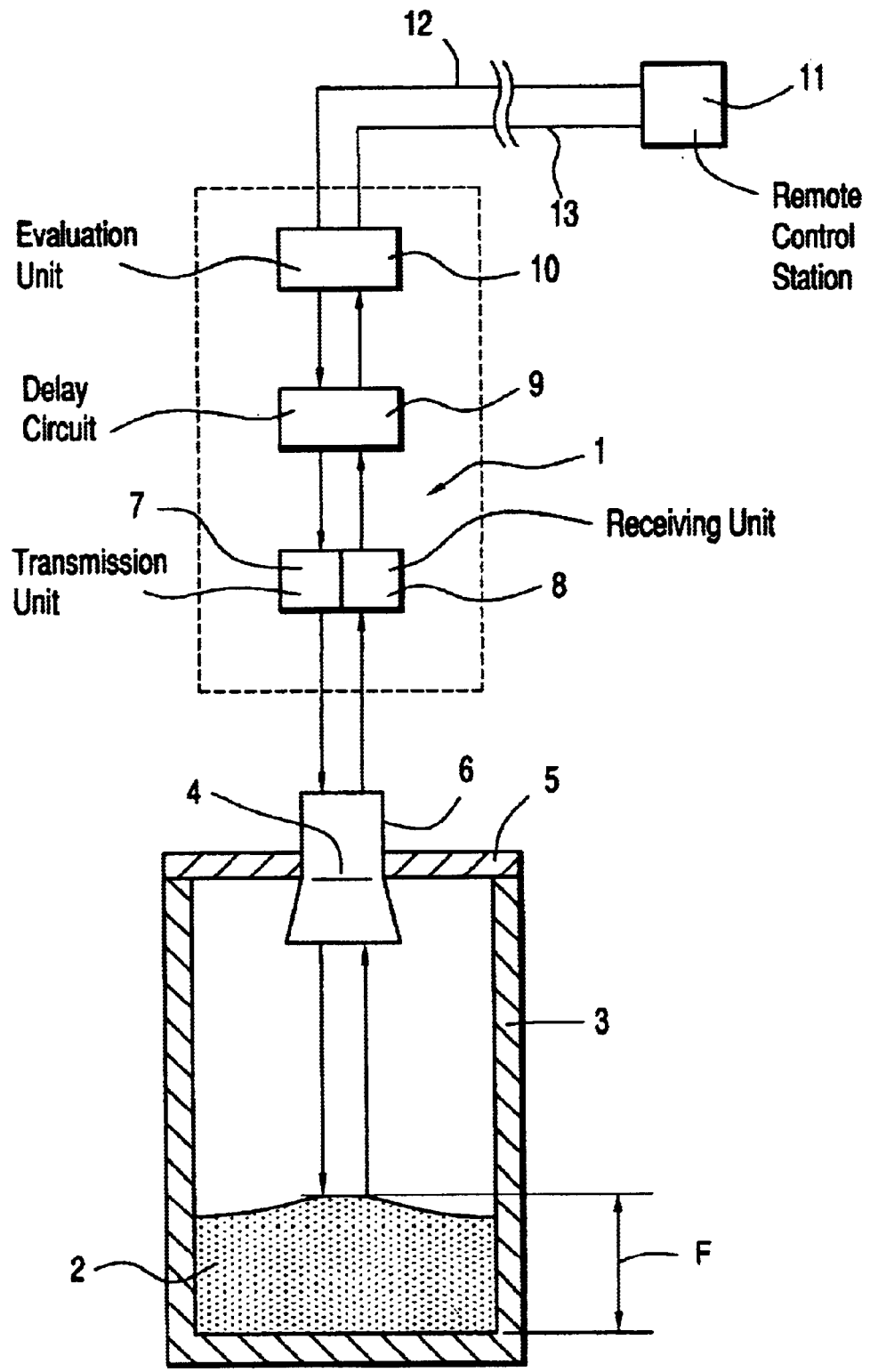

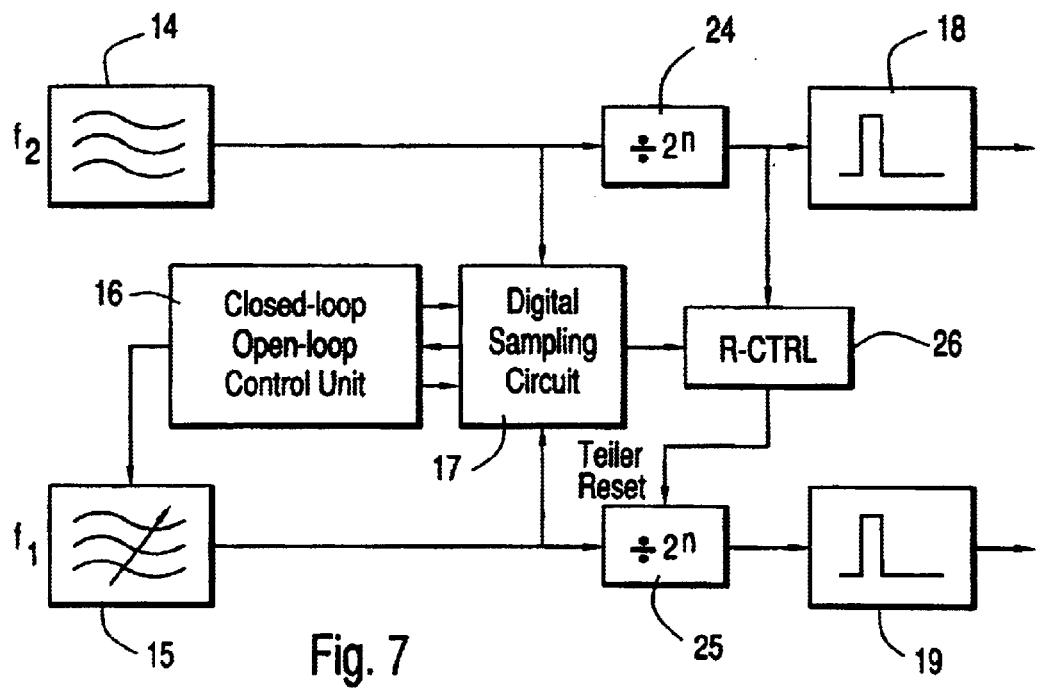
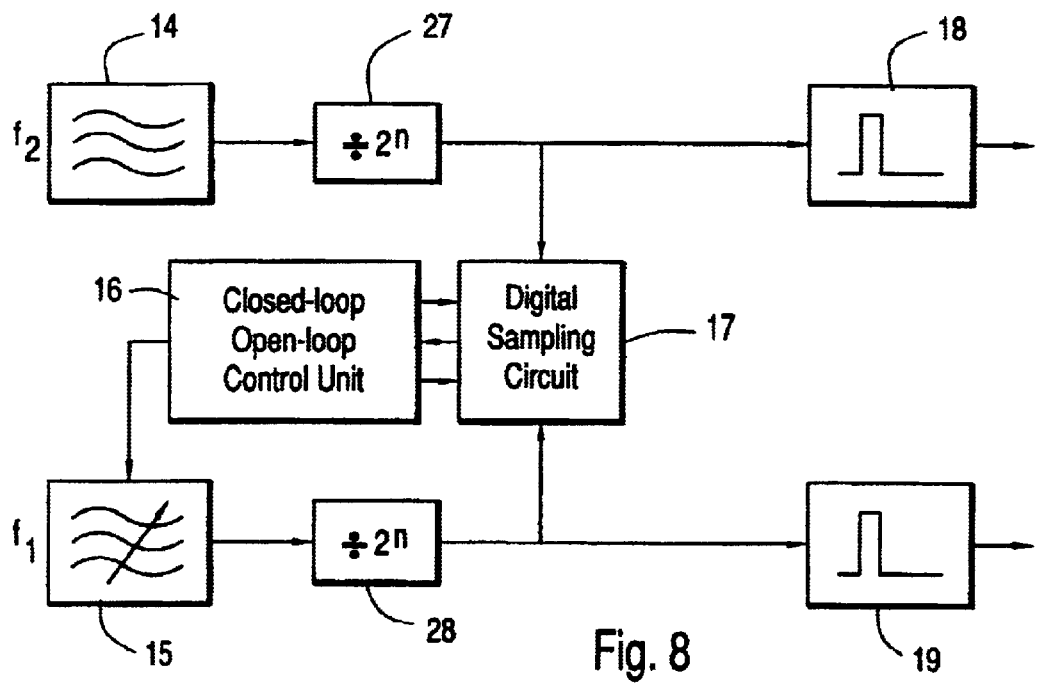

APPARATUS FOR DETERMINING THE FILLING LEVEL OF A PRODUCT IN A CONTAINER

This application relies for priority on a prior filed provisional application, filed Mar. 21, 2001, and assigned Appln. No. 60/277,256.

FIELD OF THE INVENTION

The invention relates to an apparatus and a method for determining the filling level of a product in a container with a transmission unit, which generates high-frequency signals and emits them at a predetermined transmission repetition frequency or shot rate (PRF=Pulse Repetition Frequency) in the direction of the surface of the filled product, the high-frequency signals being reflected at the surface of the product, with a receiving unit, which receives the reflected signals, with a delay circuit, which transforms the high-frequency signals/reflected signals into low-frequency signals in accordance with a predetermined translation factor, and with an evaluation unit, which determines the filling level of the product in the container on the basis of the delay time of the signals.

BACKGROUND OF THE INVENTION

Apparatuses and methods for determining the filling level via the delay time of measuring signals (pulse or FMCW frequency-modulated continuous signals) use the physical law according to which the transit distance is equal to the product of the delay time and propagation velocity. In the case of filling level measurement, the transit distance corresponds to twice the distance between the antenna and the surface of the filled product. The actual useful echo signal and its delay time are preferably determined on the basis of the echo function or the digital envelope curve of the low-frequency signal, the echo curve reproducing the amplitudes of the echo signals as a function of the 'antenna—surface of the filled product' distance or the delay time. The filling level itself is then obtained from the difference between the known distance of the antenna from the bottom of the container and the distance of the surface of the filled product from the antenna, determined by the measurement.

DE 31 07 444 A1 provides a description of a high-resolution pulsed radar method. A generator generates first microwave pulses and transmits them via an antenna at a predetermined transmission repetition frequency in the direction of the surface of the filled product. A further generator generates reference microwave pulses, which are identical to the first microwave pulses but differ slightly from them in the transmission repetition frequency. The echo signal and the reference signal are mixed. At the output of the mixer there is an intermediate-frequency signal. The intermediate-frequency signal has the same waveform as the echo signal, but is stretched in comparison with the latter by a translation factor which is equal to a quotient of the transmission repetition frequency and the difference in frequency between the repetition frequency of the first microwave pulses and the repetition frequency of the reference microwave pulses. At a transmission repetition frequency of several megahertz, a difference in frequency of a few hertz and a microwave frequency of several gigahertz, the frequency of the intermediate-frequency signal is far below 1 MHz. The advantage of the transformation to the intermediate frequency is that relatively slow, and consequently low-cost, electronic components can be used for signal acquisition and/or signal evaluation. You are referred in this connection also to the German utility model DE-U 298 15 069. 7, which describes the known transformation technique in the case of a TDR filling-level measuring device.

A prerequisite for time delay by means of so-called sequential sampling is that the time difference between two successive sampling points is to a great extent constant. In the case of the mixer principle described above, preferably two quartz oscillators generate two oscillations with slightly different frequencies. The slight 'detuning' of the two oscillations causes a phase shift, increasing linearly with each period.

One of the disadvantages of the mixer principle is the relatively high power consumption, so that the energy supply by means of a 4–20 mA current loop, a widespread industrial standard, can be provided here only at measuring rates of one measured value per second.

SUMMARY OF THE INVENTION

An object of the invention is to provide a highly accurate and low-cost delay circuit. A further object of the invention is to provide a method with which a translation of the high-frequency signals into the low-frequency range can be carried out at low cost and with high accuracy. These objects are achieved by a delay circuit which has the following elements: a transmission oscillator, which generates transmission pulses at a transmission frequency; a sampling oscillator, which generates sampling pulses at a sampling frequency, the sampling frequency differing from the transmission frequency; a digital sampling circuit, which samples the transmission pulses with the sampling pulses; a closed-loop/open-loop control unit, which sets the difference in frequency between the transmission oscillator and the sampling oscillator in such a way that the predetermined translation factor is achieved. In particular, the digital sampling circuit is a phase detector, with the transmission frequency being sampled at the sampling frequency. According to the invention, consequently the period duration of the transmission frequency is plotted in a directly time-dilated form - and consequently transformed into the low-frequency range.

Figure 2:
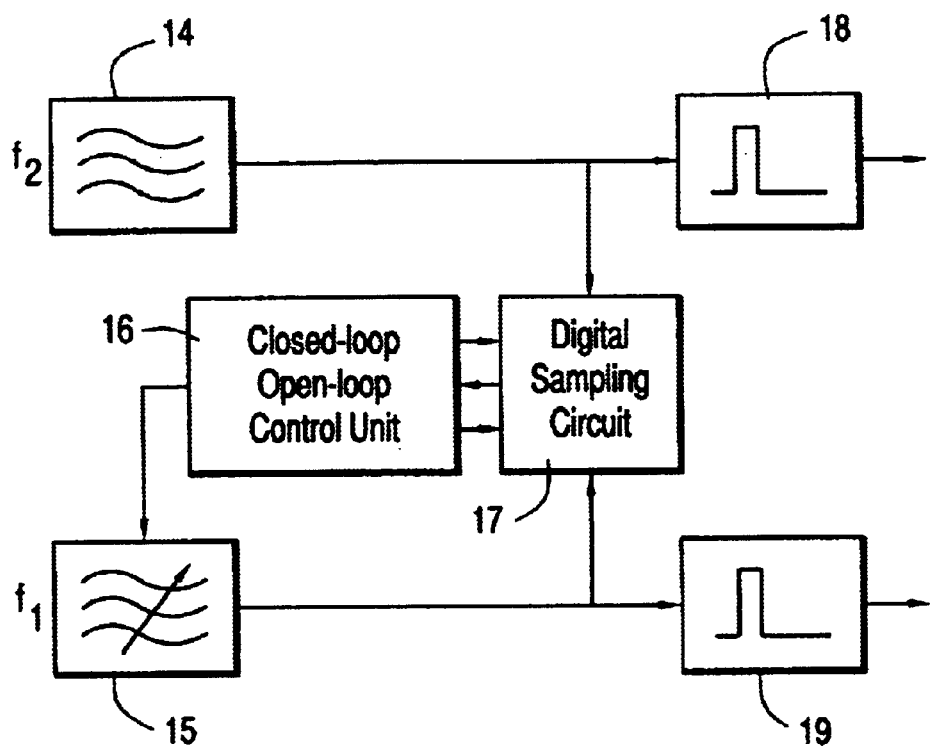
Figure 3:
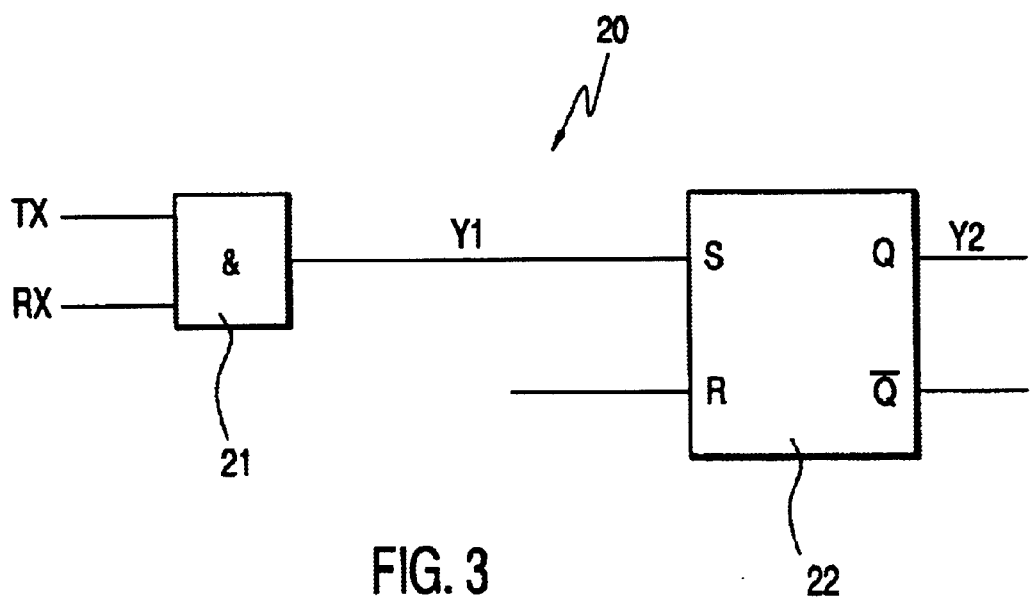
Figure 4:
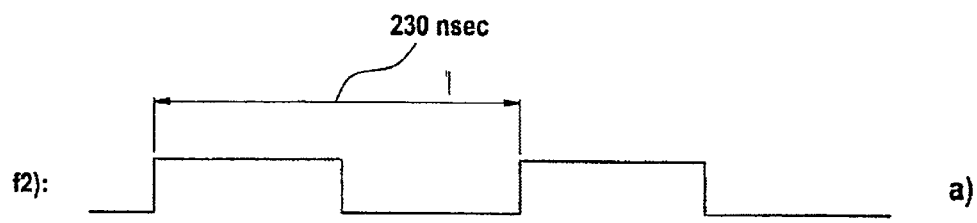
Figure 4:
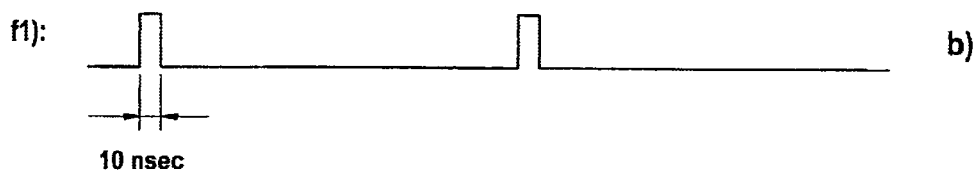
Figure 4:
Figure 4:
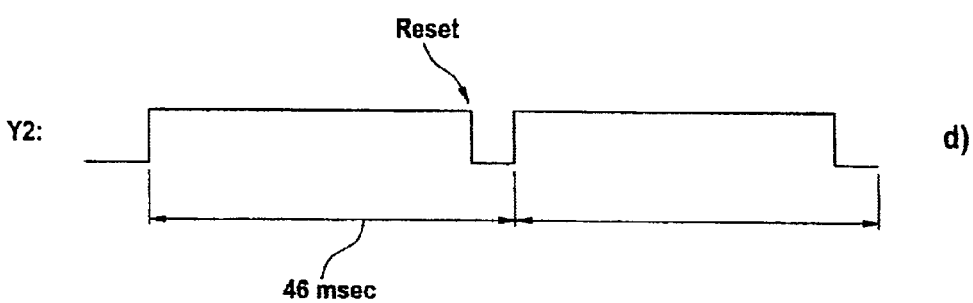
Figure 5:
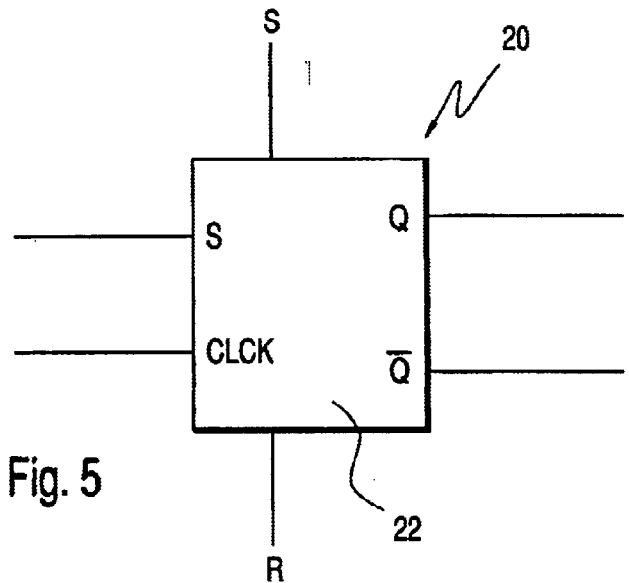
Figure 6:
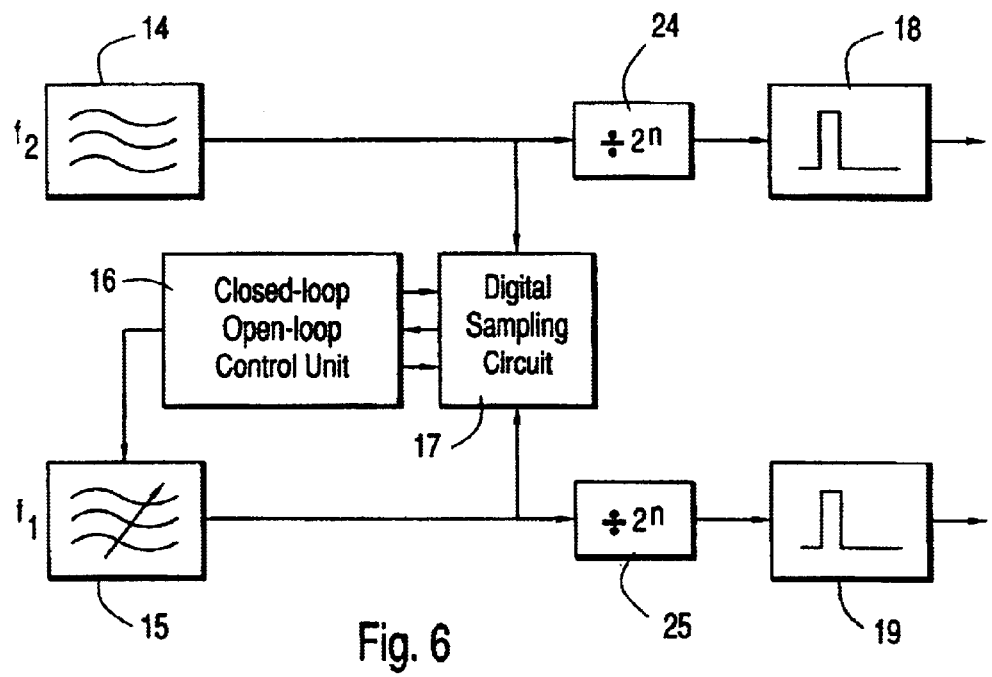

The invention is explained in more detail on the basis of the following drawings, in which:

FIG. 1 shows a schematic representation of the apparatus according to the invention, FIG. 2 shows a block diagram of the delay circuit according to the invention, FIG. 3 shows the representation of a first memory unit which is used in the sampling circuit according to the invention, FIG. 4 shows the representations of different signal waveforms a) the representation of the transmitted signal Tx present at the input of the AND gate shown in FIG. 3, b) the representation of the sampling signal Rx present at the input of the AND gate shown in FIG. 3, c) the representation of the output signal Y1 present at the output of the AND gate shown in FIG. 3, d) the representation of the output signal Y2 present at the Q output of the SR flipflop shown in FIG. 3, FIG. 5 shows the representation of a second memory unit, which is used in the sampling circuit according to the invention, FIG. 6 shows a block diagram of a first variant of the delay circuit according to the invention, with a frequency divider following the digital sampling circuit, FIG. 7 shows a block diagram of a second variant of the delay circuit according to the invention, with a frequency divider following the digital sampling circuit, and FIG. 8 shows a block diagram of the delay circuit according to the invention, with a frequency division being carried out before the digital sampling.

DETAILED DESCRIPTION

To be regarded as a major advantage of the apparatus according to the invention is its low power consumption. The power consumption is so low that a filling-level measuring device equipped with the digital sampling circuit can be operated via a two-wire line without any problem. The 4–20 mA current loop that is widespread in industrial application may be mentioned as an example. Here, current values of 4–20 mA represent the measured values. These current values are transferred over this two-wire line, via which the measuring device is supplied with power.

In the case of the analog mixing of the sampling signal and transmitted signal disclosed by the prior art, usually only one measured value per second can be provided. The reason for this relatively low measuring rate is that the known two-wire variants of radar filling-level measuring devices only operate correctly in intermittent operation. Intermittent means that, after emitting a measuring signal and subsequently carrying out the measurement, the device is switched into a standby mode in which scarcely any energy is consumed. In the standby phase, an energy store is filled. Only when there is sufficient energy in the energy store is the next measuring signal emitted. The problematical aspect of this is that the control loop formed by a closed-loop/open-loop control unit has to be opened in the standby phase, with the result that the differential frequency and consequently the translation factor drift in an uncontrolled way.

Before the next measured value determination can take place, the differential frequency must be reset in an adjusting phase. It is disadvantageous that this adjusting phase normally takes somewhat longer than the actual measuring phase.

The digital sampling circuit according to the invention dispenses entirely with this adjusting phase. Therefore, either a greater number of measured values per unit of time can be made available, or else at a measuring rate of 1/sec the average power of the HF module can be half that in the case of the previously known measuring devices.

According to a preferred development of the apparatus according to the invention, the transmission frequency of the transmission oscillator is fixed; on the other hand, the sampling frequency of the sampling oscillator is adjustable.

A preferred embodiment of the apparatus according to the invention provides that the digital sampling circuit defines a measuring cycle or a measuring phase, or ascertains the difference in frequency, by determining two successive points in time at which the rising or falling edge of the sampling pulses coincides with the falling or rising edge of the transmission pulses or, to put it another way, when the transmission frequency and the sampling frequency are in phase. In addition, it is proposed that the digital sampling circuit stores the point in time at which the transmission oscillator and the sampling oscillator are in phase in a memory unit as the starting time for the measurement and the ascertainment of the difference in frequency.

According to an advantageous embodiment, the memory unit is a D flipflop. An alternative embodiment provides that the memory unit is a logical gate, preferably an AND gate, and an SR flipflop.

To reduce the measuring error, an advantageous development of the apparatus according to the invention proposes that, to determine the difference in frequency, the closed-loop/open-loop control unit performs an averaging over a number of measuring cycles. This improves the measuring accuracy.

It has been found to be particularly advantageous with respect to the power demand if the closed-loop/open-loop control unit activates the digital sampling circuit only shortly before, during and after the times at which the transmission frequency and sampling frequency are in phase.

According to a preferred embodiment of the apparatus according to the invention, it is provided that the digital sampling circuit is followed by two monopulse generators, which generate brief pulses from the transmitted or received signals.

A particularly interesting variant of the apparatus according to the invention proposes frequency dividers, which divide the transmission frequency and/or the sampling frequency before and/or after the digital sampling circuit. It is preferred for the divider factor to be predetermined and based on $2^n$, where n=1, 2, 3, . . . . By dividing the frequency of the transmitted signal and of the sampling signal before the digital sampling, and/or after the digital sampling, the shot rate, that is the frequency at which measuring signals are emitted in the direction of the filled product, is correspondingly reduced. At the same time, the measuring time and the measuring range are increased by the divider factor.

If the frequency division takes place after the digital sampling—that is to say the difference in frequency is measured before the frequency division—an advantageous development provides a resetting unit which starts the respectively following measuring cycle as soon as the difference in phase between the transmission frequency and the sampling frequency is equal to the quotient of 360° and the divider factor $2^n$, where n=1, 2, 3, . . . . . Consequently, here the next measuring cycle is started, for example, as soon as the difference in phase between the sampling frequency and the transmission frequency is 90°. This embodiment is particularly advisable in the case of the so-called TDR measuring devices, which pass broadband monopulses along a conductive element in the direction of the filled product. This is because it has been found that the high-frequency part of a corresponding TDR device operates optimally when the transmission repetition frequency (PRF=Pulse Repetition Frequency) or the shot rate is not in the megahertz range but is around several kilohertz. In particular, the signal-to-noise ratio is improved by this measure, without it being necessary to forgo the quartz oscillators, which operate in the megahertz range and are advantageous from many aspects. In particular, the resetting unit resets the edge of the sampling signal with the aid of the differential frequency signal in such a way that the phase shift between the transmitted signal and the sampling signal goes only over a defined subrange of 360°. Consequently, the transmission repetition frequency with the same measuring window is reduced by the divider factor $2^n$, where n=1, 2, 3, . . . .

As already mentioned above, the transmission oscillator and the sampling oscillator are quartz oscillators.

With respect to the method according to the invention, the object is achieved by the following method steps: transmission pulses are generated at a transmission frequency and sampling pulses are generated at a sampling frequency; the transmission pulses are sampled digitally with the sampling pulses; the difference in frequency between the transmission pulses and the sampling pulses is controlled in such a way that the predetermined translation factor is achieved.

FIG. 1 shows a schematic representation of the apparatus 1 according to the invention. The apparatus 1 according to the invention serves in the embodiment shown for measuring the filling level F of a product 2, which is stored in the container 3. The filling-level measuring device is either a compact device, in which the actual sensor part and the electronic components are accommodated in a housing, or the electronic components are spatially separate from the sensor part, here the antenna 6. Incidentally, corresponding filling-level measuring devices in which the measuring signals are transmitted freely via an antenna 6 are sold by the applicant, for example under the name Micropilot.

In the case shown, the antenna 6 is arranged in an opening 4 in the cover 5 of the container 3. The measuring signals generated in the transmission unit 7 are transmitted via the antenna 6 in the direction of the surface of the filled product 2; similarly, the echo signals reflected at the surface of the product 2 are received by the antenna 6 and pass from there into the receiving unit 8. By means of the delay circuit 9, which is also represented in different embodiments in the drawings which follow, the measuring signals or the reflected echo signals or received signals are transformed from the high-frequency range into the low-frequency range. On the basis of the delay time of the low-frequency signals, the evaluation unit 10 ascertains the filling level F of the product 2 in the container 3.

In the exemplary embodiment shown, the filling-level measuring device is connected to a remote control station 11 via a two-wire line 12, 13. As the transmission standard, a 4–20 mA current loop is used for example. It goes without saying that the filling-level measuring device may also communicate digitally with the remote control station 11 via a bus system. Examples of possible bus systems which may be mentioned at this point are Profibus PA, Fieldbus Foundation and Ethernet. It goes without saying that communication may also take place in a wireless form.

Apart from the filling-level measuring device shown in FIG. 1, which transmits the measuring signals freely via the antenna 6, filling-level measuring devices in which the measuring signals and echo signals are passed along a conductive element in the direction of the filled product 2 are also known. Corresponding devices are offered and sold by the applicant under the name Levelflex.

FIG. 2 shows a block diagram of the delay circuit 9 according to the invention. The transmission oscillator 14 generates measuring signals with the transmission frequency $f_2$. The sampling oscillator 15 generates sampling signals with the sampling frequency $f_1$. Whereas in the case shown the transmission frequency $f_2$ is constant, the sampling frequency $f_1$ is adjustable.

The digital sampling circuit 17 samples the transmission frequency $f_2$ with the sampling frequency $f_1$, that is to say operates like a phase detector. Consequently, sampling values are periodically taken from the transmitted/received signals, whereby a time-dilated plot of the echo curve is produced if it is ensured that the difference in frequency $f_2-f_1$ between the transmitted signal and the sampling signal is constant. The closed-loop/open-loop control unit 16 ensures the correct setting of the difference in frequency $f_2-f_1$.

Consequently, the period duration of the transmission frequency $f_2$ is plotted in a directly time-dilated form by the digital sampling. In principle, it is sufficient to detect the coincidence of the edges of transmitted signals and sampling signals. Furthermore, the digital sampling circuit 17 according to the invention can operate in pulse mode, without the individual components of its circuit having to be reset before the start of the actual measuring phase—as is still necessary in the case of the previously known analog solutions. Consequently, it is to be regarded as a great advantage of the digital delay circuit 17 according to the invention that it can be used without any problem in two-wire devices, known to provide only limited power.

The two monopulse generators 18, 19 serve for driving the high-frequency part, which is used for example in the Micropilot device sold by the applicant. They generate needle-shaped pulses of a few nanoseconds in length from the transmitted signals and the sampling signals.

FIG. 3 shows a block diagram of a first memory unit 20, which can be used in the sampling circuit 17 according to the invention. The transmitted signals Tx with the transmission frequency $f_2$ of the transmission oscillator 14 that are present at the first input of the AND gate 21 have the signal waveform shown in FIG. 4a. The period duration is, for example, 230 nanoseconds. The sampling signals Rx of the sampling oscillator 15 with the sampling frequency $f_1$ that are present at the second input of the AND gate 21 are pulsed, the pulse width being a few nanoseconds, for example 10 nsec. The corresponding signal waveform of the sampling signals is shown in FIG. 4b. The AND gate 21 consequently supplies a high level for as long as the high levels of the transmitted signal Tx and the sampling signal Rx are shifted over each other. This signal waveform is represented in FIG. 4c. As soon as the falling edge of the sampling signal Rx is in phase with the rising edge of the transmitted signal Tx, or generally only as long as a high signal of the sampling signal and of the transmitted signal are present simultaneously at the AND gate, the AND gate 21 outputs a high signal. This information on the in-phase position of the transmitted signal Tx and the sampling signal Rx is stored with the aid of the SR flipflop 22. The SR flipflop 22 consequently outputs a high level which serves as a trigger and indicates the beginning of a new measuring phase. Within this measuring phase, the resetting of the SR flipflop 22 takes place, for example by means of the closed-loop/open-loop control circuit 16, which may comprise a microcontroller. Following a RESET, the next point in time at which an edge of the sampling signal Rx is in phase with an edge of the transmitted signal Tx can then be indicated again.

The period duration of the signal Y2 present at the Q output of the SR flipflop 22—see also FIG. 4d—is the time-dilated period of the transmitted signal Tx, with the translation factor being equal to the quotient of the period duration of the output signal Y2 and the period duration of the transmitted signal Tx. In the case shown, the translation factor is therefore 46 ms/230 ns=200,000.

FIG. 5 shows a second variant of a memory unit 20 which can be used in connection with the sampling circuit 17 according to the invention. Here, the memory element 20 is a so-called D flipflop 23, which has the same properties as the combination of the AND gate 21 and SR flipflop 22 shown in FIG. 3. The use of a D flipflop 23 is particularly favorable insofar as no RESET signal is additionally required, and here it is a low-cost memory element 20.

FIG. 6 shows a block diagram of a variant of a delay circuit 9 according to the invention, with a frequency divider 24, 25 respectively being provided after the digital sampling, before the actual transmission pulse or sampling pulse is generated in the monopulse generators 18, 19. The division factor is preferably $2^n$, where n=1, 2, 3.

This frequency division has the effect of reducing the transmission repetition frequency (PRF) by the corresponding divider factor. At the same time, the measuring range is increased by this divider factor, or to put it another way the sweep time, that is the time which elapses until the measuring range is sequentially scanned, is increased by the divider factor. It goes without saying that the differential frequency can also be determined after the division by the frequency dividers 27, 28. A corresponding circuit is represented in FIG. 8.

A block diagram of a further variant of the delay circuit according to the invention is represented in FIG. 7, with a frequency divider 24, 25 likewise respectively following the digital sampling circuit 17. As already described above, this circuit is very advantageous in the case of filling-level measuring devices which determine the filling level by means of measuring signals passed along a conductive element (→TDR measuring devices). Here it is favorable if the transmission repetition frequency is not of the megahertz order of magnitude but several hundred kilohertz. Consequently, to be able to continue using the delay circuit 9 operating with quartz oscillators 14, 15 as a preference, the edge of the sampling signal is reset at the frequency divider 25 with the aid of the differential frequency signal. The resetting takes place by means of the resetting circuit 26. Consequently, the phase shift between the transmitted signal and the sampling signal is not then measured over a period—that is over 360°—but is reduced by the divider factor and is, for example, then only 45°. This leaves the sweep time unchanged and the measuring range also virtually unchanged. Only the transmission repetition frequency is reduced—as desired—by the respective divider factor. In the case of the circuit arrangement shown in FIG. 8, incidentally, the differential frequency is measured by the digital sampling circuit 17 after the frequency division.

What is claimed is:

1. Apparatus for determining the filling level of a product in a container having:
    a transmission unit, which generates high-frequency signals and emits them at a predetermined pulse repetition frequency in the direction of the surface of the filled product, the high-frequency signals being reflected at the surface of the product;
    a receiving unit, which receives the reflected signals, with a delay circuit, which transforms the high-frequency signals/reflected signals into low-frequency signals in accordance with a predetermined translation factor; and
    an evaluation unit, which determines the filling level of the product in the container on the basis of the delay time of the signals, wherein the delay circuit includes:
        a transmission oscillator, which generates transmission pulses at a transmission frequency ($f_2$);
        a sampling oscillator, which generates sampling pulses at a sampling frequency ($f_1$), the sampling frequency ($f_1$) being less than the transmission frequency ($f_2$);
        a digital sampling circuit, which samples the transmission pulses with the sampling pulses; and
        a closed-loop/open-loop control unit, which sets the difference in frequency ($f_2-f_1$) between the transmission oscillator and the sampling oscillator in such a way that said predetermined translation factor is achieved.

2. The apparatus as claimed in claim 1, wherein said transmission oscillator has a fixed transmission frequency ($f_2$), and wherein the sampling frequency ($f_1$) of said sampling oscillator is adjustable.

3. The apparatus as claimed in claim 2, wherein said digital sampling circuit is a phase detector.

4. The apparatus as claimed in claim 1, wherein said digital sampling circuit is a phase detector.

5. The apparatus as claimed in claim 1, wherein said transmission oscillator and said sampling oscillator are quartz oscillators.

6. The apparatus as claimed in claim 1, wherein said digital sampling circuit defines a measuring cycle, or determines the difference in frequency, by determining two successive points in time at which the rising or falling edge of the sampling pulses coincides with the falling or rising edge of the transmission pulses, that is when the transmission frequency ($f_2$) and the sampling frequency ($f_1$) are in phase.

7. The apparatus as claimed in claim 1, wherein said digital sampling circuit stores the point in time at which said transmission oscillator and said sampling oscillator are in phase in said memory unit as the starting time for the measurement and the ascertainment of the difference in frequency ($f_2-f_1$).

8. The apparatus as claimed in claim 1, wherein, to determine the difference in frequency ($f_2-f_1$), the closed-loop/open-loop control unit performs an averaging over a number of measuring cycles.

9. The apparatus as claimed in claim 1, wherein said closed-loop/open-loop control unit activates said digital sampling circuit only shortly before, during or after the times at which the transmission frequency ($f_2$) and sampling frequency ($f_1$) are in phase.

10. The apparatus as claimed in claim 1, wherein said digital sampling circuit is followed by two monopulse generators, which generate measuring pulses from the transmitted or received signals.

11. The apparatus as claimed in claim 1, 2, 4 or 3, wherein said digital sampling circuit defines a measuring cycle, or determines the difference in frequency, by determining two successive points in time at which the rising or falling edge of the sampling pulses coincides with the falling or rising edge of the transmission pulses, that is when the transmission frequency ($f_2$) and the samlping frequency ($f_1$) are in phase.

12. The apparatus as claimed in claim 1, 2, 4, 3 or 6 wherein said digital sampling circuit stores the point in time at which said transmission oscillator and said sampling oscillator are in phase in a memory unit as the starting time for the measurement and the ascertainment of the difference in frequency ($f_2-f_1$).

13. The apparatus as claimed in claim 12, wherein said memory unit is a D flipflop.

14. The apparatus as claimed in claim 12, wherein said memory unit is a logical gate, preferably an AND gate, and an SR flipflop.

15. The apparatus as claimed in claim 1, 2, 4, 3 or 6, wherein, to determine the difference in frequency ($f_2-f_1$), a closed-loop/open-loop control unit performs an averaging over a number of measuring cycles.

16. The apparatus as claimed in claim 1, 2, 4, 13, 14, 3, 6 or 7, wherein said closed-loop/open-loop unit activates the digital sampling circuit only shortly before, during or after the times at which the transmission frequency ($f_2$) and sampling frequency ($f_1$) are in phase.

17. The apparatus as claimed in claim 1, 2, 4, 13, 14, 2, 6 or 7 wherein said digital sampling circuit is followed by two monopulse generators, which generates measuring pulses from the transmitted or received signals.

18. The apparatus as claimed in claim 1, 2, 4, 13, 14, 3, 6, 7, 8, 9 or 10, wherein frequency dividers are provided, which divide the transmission frequency ($F_2$) and/or the sampling frequency ($f_1$) before and/or after said digital sampling circuit by a predetermined divider factor $2^n$, where n=1, 2, 3 . . . .

19. The apparatus as claimed in claim 18, wherein a resetting unit is provided, which starts the following measuring cycle as soon as the difference in phase between the transmission frequency ($f_2$) and the sampling frequency ($f_1$) is equal to the quotient of 360° and the divider factor $2^n$, where n=1, 2, 3 . . . .

20. A method for determining and/or monitoring the distance from an object, in particular for determining and/or monitoring the filling level of a product in a container, comprising the steps of:

generating high-frequency signals and emitting said generated signals at a predetermined pulse repetition frequency in the direction of the object, in particular in the direction of the surface of the filled product, reflecting the high-frequency signals at the surface of the product and receiving the reflected signals;

transforming the high-frequency/reflected signals into low-frequency signals in accordance with a predetermined translation factor; and determining the distance or the filling level of the product in the container on the basis of the delay time of the signals, wherein :

transmission pulses are generated at a transmission frequency ($f_2$) and sampling pulses are generated at a sampling frequency ($f_1$);

said transmission pulses are sampled digitally with the sampling pulses, and the difference in frequency ($f_2-f_1$) between the transmission pulses and the sampling pulses is controlled in such a way that the predetermined translation factor is achieved.

* * * * *